United States Patent
Devarakonda et al.

(10) Patent No.: US 7,917,889 B2
(45) Date of Patent: Mar. 29, 2011

(54) DATA LOCATIONS TEMPLATE BASED APPLICATION-DATA ASSOCIATION AND ITS USE FOR POLICY BASED MANAGEMENT

(75) Inventors: Murthy V. Devarakonda, Peekskill, NY (US); Konstantinos Magoutis, New York, NY (US); Norbert G. Vogl, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 1318 days.

(21) Appl. No.: 11/455,573

(22) Filed: Jun. 19, 2006

(65) Prior Publication Data
US 2007/0294661 A1 Dec. 20, 2007

(51) Int. Cl.
*G06F 9/44* (2006.01)
*G06F 9/45* (2006.01)
(52) U.S. Cl. ........... 717/104; 717/121; 717/174; 703/22
(58) Field of Classification Search .................. 717/104, 717/121, 174; 703/22
See application file for complete search history.

(56) References Cited

U.S. PATENT DOCUMENTS

| | | | |
|---|---|---|---|
| 7,096,258 B2 * | 8/2006 | Hunt et al. | 709/220 |
| 7,188,335 B1 * | 3/2007 | Darr et al. | 717/121 |
| 2003/0131338 A1 * | 7/2003 | Georgalas | 717/104 |
| 2004/0006610 A1 * | 1/2004 | Anagol-Subbarao et al. | 709/222 |
| 2007/0006218 A1 * | 1/2007 | Vinberg et al. | 717/174 |

* cited by examiner

*Primary Examiner* — Lewis A Bullock, Jr.
*Assistant Examiner* — Hang Pan
(74) *Attorney, Agent, or Firm* — Scully, Scott, Murphy & Presser, P.C.; Louis J. Percello, Esq.

(57) ABSTRACT

Method and system are disclosed for automatically discovering associations between applications and data in multi-tiered distributed systems. The method in one aspect uses a machine-readable specification of a model or template that describes use and transformation of data by software components. The method additionally utilizes a model of system configuration and appropriate runtime support to mine information available from systems management software present in enterprise systems. The application-data association discovery process performs a traversal of the distributed system configuration graph with actions taken during this traversal driven by the contents of the templates for the software components present in the system. The results of the application-data association discovery process are stored in a database and may be used to specify application-specific information lifecycle management (ILM) policy or as input to impact analysis tools in access control and antivirus systems.

1 Claim, 8 Drawing Sheets

DATA LOCATIONS TEMPLATE BASED APPLICATION-DATA ASSOCIATION AND ITS USE FOR POLICY BASED MANAGEMENT

FIELD OF THE INVENTION

This application relates generally to software modeling and distributed systems.

BACKGROUND OF THE INVENTION

Modern business information systems are typically structured as multi-tiered distributed systems comprising Web services, application services, databases, enterprise information systems, file systems, and other storage systems. In such environments, data is stored at multiple tiers, each tier associated with a different level of data abstraction. All data entities that map to an information entity owned and used by an application are logically associated, across tiers, and related to the application. Discovery of such relationships in a distributed system is a challenging problem that requires understanding how data is used and transformed. For example, discovering which logical storage volume(s) a business application uses and thus depends on requires first discovering, at a higher level, which data sources the application is using and how these data sources may map to databases; consequently, it requires discovering how database tables transform to file system files and/or logical storage volumes, and so on.

Discovery of such relationships is complicated by at least two trends in system design today: first, the widespread adoption of virtualization technologies enforces a separation between distributed system tiers. In addition, the traditional tendency to view the "server domain" independently from the "storage domain", from a systems management perspective, is another factor contributing to this information gap.

Manual discovery of application-data associations is a difficult and error-prone task. A known technique discovers application-data relationships using online system monitoring and training heuristics for applications and data residing in a single computer system. However, this prior art technique has several drawbacks including: (a) being based purely on heuristic rules, it cannot eliminate the possibility of overlooking some application-data relationships ("false negatives"); (b) it does not relate applications running on one computer with applications and/or data on another computer.

Another prior art technique builds distributed system dependency graphs using active (e.g., fault injection) or passive (e.g., trace collection and offline analysis) methods. The dependency graphs show how applications on one computer system communicate with applications on another computer system. Antivirus programs, access control systems, disaster recovery management systems, and information lifecycle management systems are other potential consumers of application-data association information. Accordingly, what is desired is an improved system and method for automatic discovery of application-data relationships spanning multiple-tiers.

BRIEF SUMMARY OF THE INVENTION

A system and method for automatic discovery of application-data relationships spanning multiple tiers is disclosed. The system in one aspect includes system configuration template description that models a system configuration of computer system, for instance, an enterprise system. The system configuration template description includes at least description of one or more software components on the computer system. The system also includes software template description that models at least one of use and transformation of data by one or more software components on a computer system. Each software component on the computer system has a corresponding software template description. A processor is operable to extract information associated with the computer system. The extracted information is used to build the system configuration template description and the software template description. The processor is further operable to traverse the system configuration template description and the software template description to discover application and data associations.

A method for automatic discovery of application-data relationships in one aspect includes modeling a system configuration of a computer system using a predefined template defining distributed system infrastructure. The modeled system configuration includes at least description of one or more software components in the computer system. The method also includes modeling one or more software components described in the modeled system configuration using a predefined software component template. The modeled one or more software components includes at least description of at least one of use and transformation of data by the one or more software components. The modeled one or more software components are extended to include at least installation-specific information related to the at least one of use and transformation of data by one or more software components. The method further includes traversing the modeled system configuration and the one or more software components to discover application and data associations.

Further features as well as the structure and operation of various embodiments are described in detail below with reference to the accompanying drawings. In the drawings, like reference numbers indicate identical or functionally similar elements.

DETAILED DESCRIPTION

Figure 1:
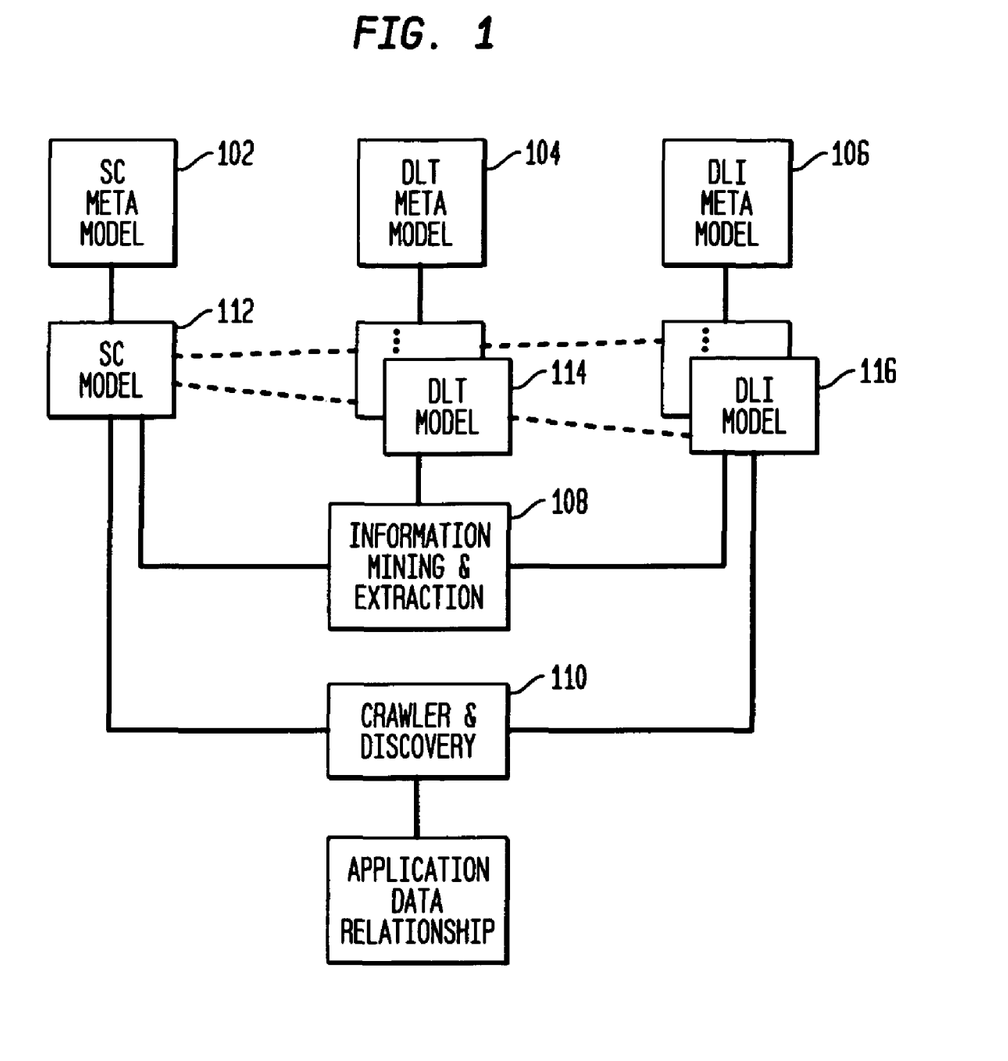
FIG. 1 is a diagram illustrating an overview of system architecture in one embodiment.

FIG. 1 illustrates an overview of system architecture in one embodiment of the present disclosure. In an exemplary embodiment, three meta-models provide descriptions of distributed system infrastructure and of data consumption and data transformation in software components. In general, a meta-model is a precise definition of the constructs and rules needed for creating semantic models of particular entities. Another way to think about meta-models is as collections of "concepts" (e.g., things, terms, etc.) that make up a vocabulary with which one can talk about a certain domain. It is a similar concept to a "schema" as used in databases or XML, or to the definition of a class in object-oriented languages. One meta-model in an exemplary embodiment of the present disclosure describes models of distributed system infrastructure, and two meta-models describe models of software, for example, application or middleware components.

Figure 6:
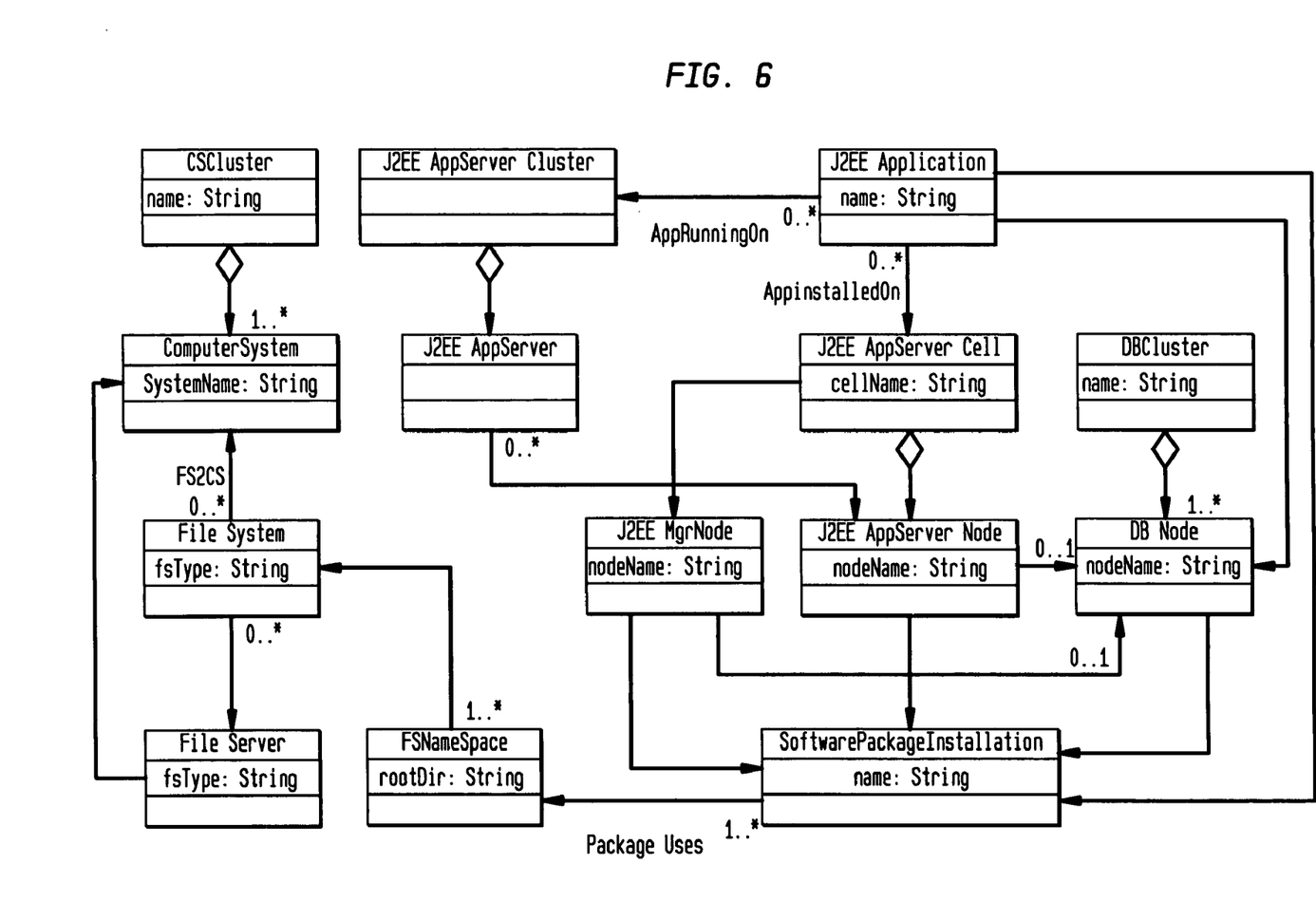
FIG. 6 illustrates an example of system configuration meta-model instance.
Figure 7:
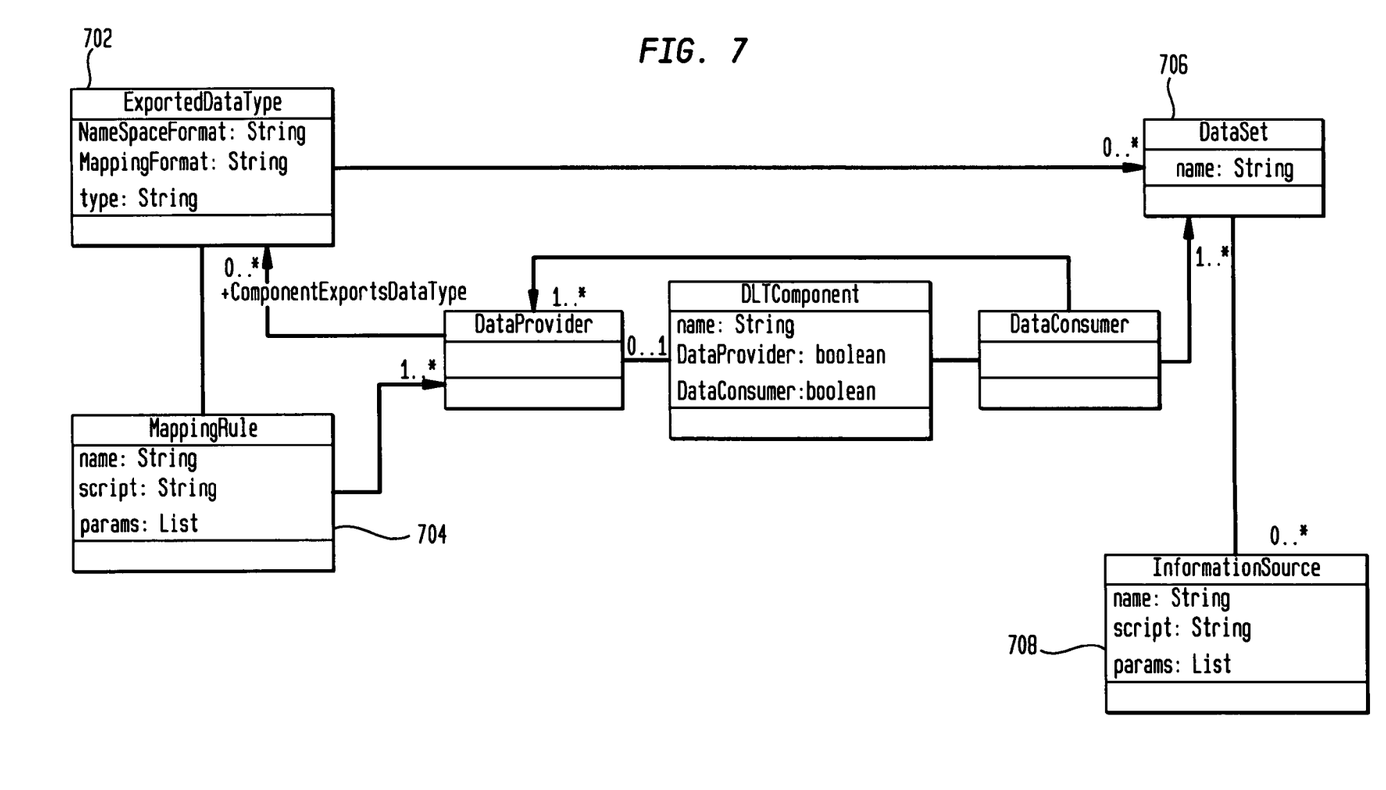
FIG. 7 illustrates an example of data locations template (DLT) meta-model in one embodiment.
Figure 8:
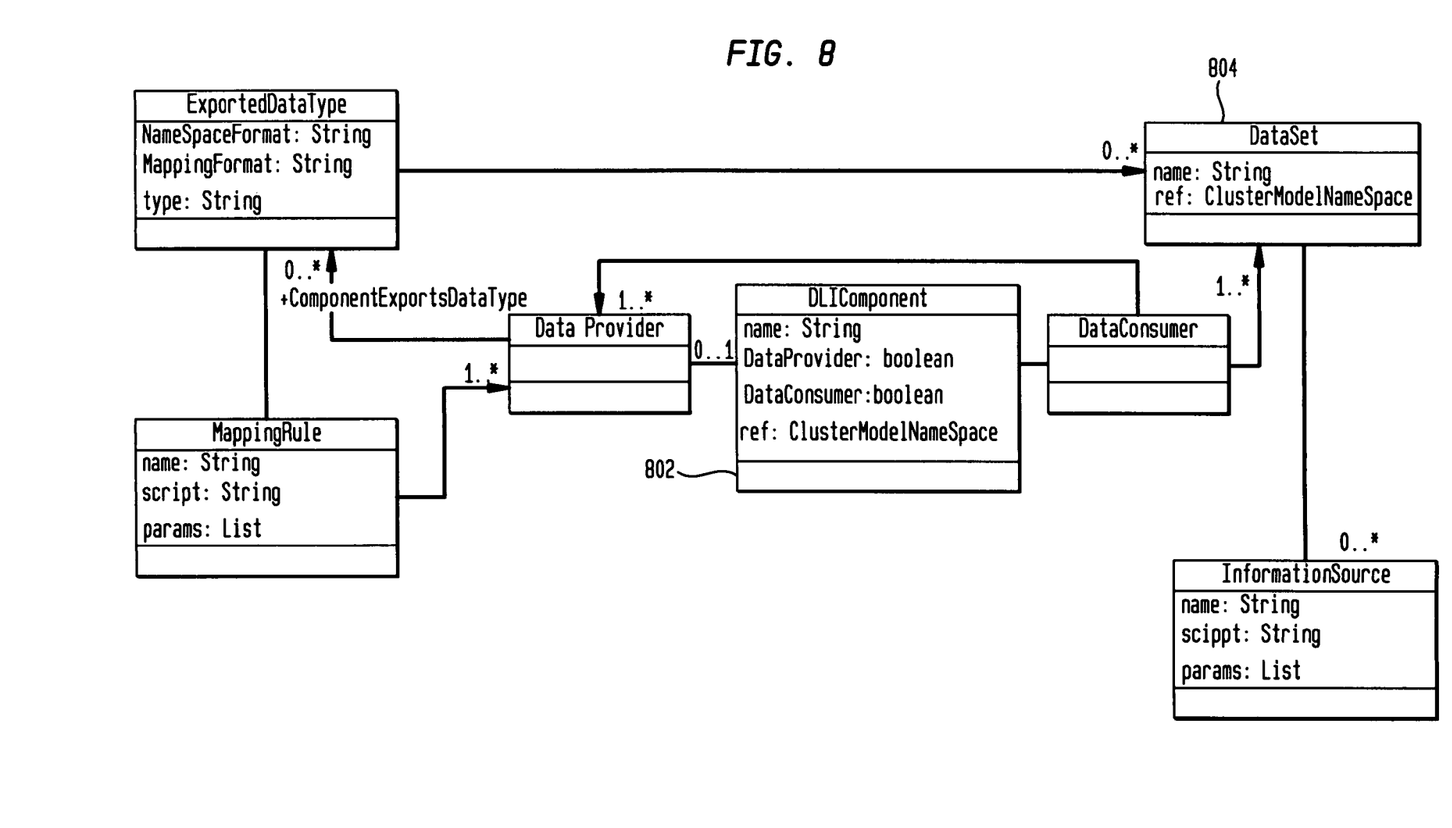
FIG. 8 illustrates an example of data locations instance (DLI) meta-model in one embodiment.

In one embodiment, the meta-models may include a System Configuration (SC) meta-model 102; the Data Locations Template (DLT) meta-model 104; and the Data Locations Instance (DLI) meta-model 106. The UML diagrams for these meta-models are shown in FIG. 6, FIG. 7, and FIG. 8, respectively. Although the exemplary embodiment is illustrated herein with references to three meta-models, it should be understood that the system and method of the present disclosure does not limit the number of meta-models to only three and that more or less number may be used.

In one embodiment, these meta-models are instantiated into specific models of the system infrastructure and the software components in the distributed system being considered. Such instantiation in one embodiment are performed as part of a pre-discovery process. A runtime logic 108, for example, program of instructions or scripts mine or extract system information to build the instantiated models. A crawling algorithm 110 uses the models 112, 114, 116 to automatically discover application-data associations in distributed systems. In an exemplary embodiment, the crawling algorithm 110 is distributed but is not limited to such. For example, the crawling algorithm 110 may be run from a centralized system.

In an exemplary embodiment of the present disclosure, distributed systems are modeled using the System Configuration (SC) meta-model 102. Each instance of SC model may be represented by a respective instance of the SC meta-model as will be described with reference to FIG. 2. In one embodiment, each software component in the SC Model is associated with a DLT model.

In an exemplary embodiment of the present disclosure, Data Locations Template (DLT) meta-model 104 describes software component's consumption and transformation of data, as will be described with reference to FIG. 3. Examples of software components include but are not limited to applications and middleware. In one embodiment, descriptions of data consumption include lists of names of data-sets, which usually take the form of pathnames in some data namespace. Descriptions of data transformation usually take the form of rules, e.g., a database table with name 'X' maps to a set of table space containers {'Y'}. In one embodiment, a rule is applicable on a range of inputs rather than on a single input. A representation of the DLT meta-model in the Unified Modeling Language (UML) is illustrated in FIG. 7. In one embodiment of the present disclosure, an instantiation of the DLT meta-model is created for software components present in a distributed system being considered, for example, before the application-data relationship discovery process.

Descriptions of data consumption by a software component may be created by software modeling tools or specified by human experts, or through dynamic discovery via a variety of information sources or by any other known or will be known methods or combinations thereof. Similarly, descriptions of data transformation by a software component may be created by modeling tools or by human experts, such as software developers or system administration specialists or the like or combinations thereof, and used to dynamically discover relationships between data at different levels of abstraction. DLTs for software components may be stored in a repository and retrieved as needed by the discovery process. In one embodiment, DLTs describing major middleware components, such as Application Servers, Database Servers, or Enterprise Information Systems, may typically be created once and stored in a repository, while DLTs for applications may typically be constructed on-demand at deployment time.

Figure 2:
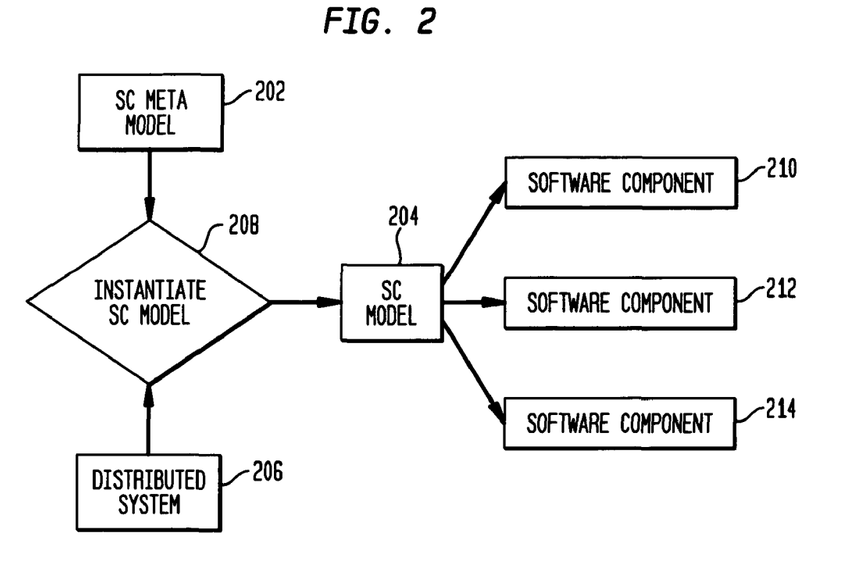
FIG. 2 is a block diagram illustrating an example of a SC model instantiation in one embodiment.

FIG. 2 is a block diagram illustrating an example of a SC model instantiation in one embodiment. A system configuration (SC) model 204, for instance, is instantiated at 208, as an instance of the SC meta-model 202 and describes the distributed system 206 being considered as an example. In one embodiment the SC model 204 forms the substrate upon which a distributed-crawler process operates. The SC model 204 is built from the distributed system being considered, for example, using IT infrastructure discovery systems, such as those populating a configuration management database (CMDB), for example, from existing registries of physical and logical assets typically found in enterprise systems. In one embodiment, the SC model 204 is built using a predefined schema, for example, a UML description shown in FIG. 6. The schema for the SC Model preferable captures details of all physical and logical elements relevant to the distributed system 206 being considered. The SC Model 204 includes one or more software components 210, 212, 214, which may consume and/or possibly transform data.

Figure 3:
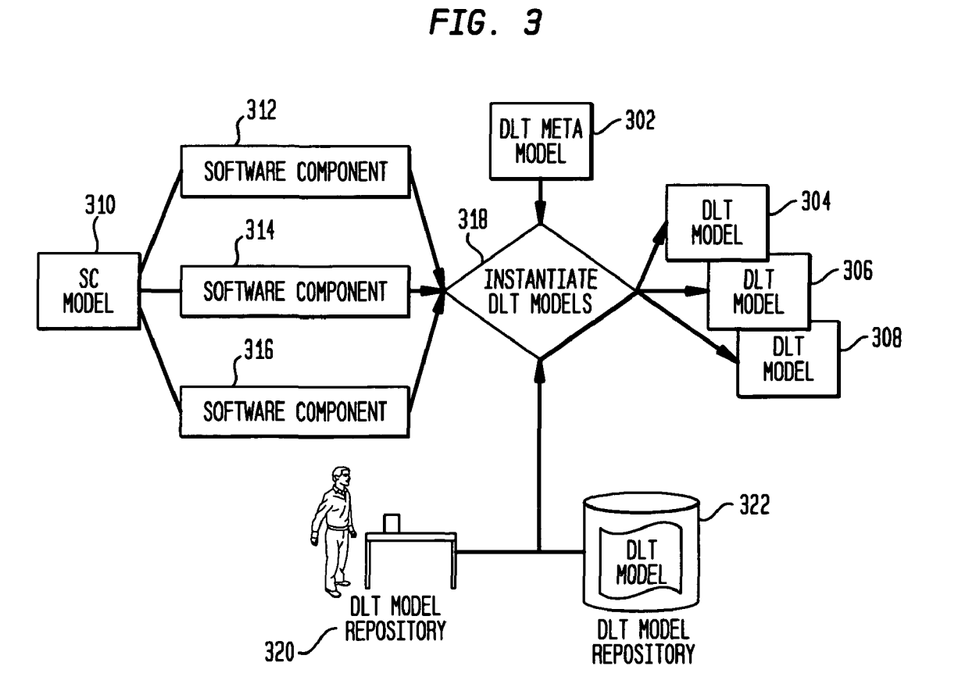
FIG. 3 is a block diagram illustrating DLT creation for software components in the SC model in one embodiment.

FIG. 3 is a block diagram illustrating DLT creation for software components in the SC model in one embodiment. In one embodiment, each software component 312, 314, 316 that consumes and/or transforms data is associated with a Data Locations Template (DLT) model 302. A DLT model 304, 306, 308 for a software component 312, 314, 316 is instantiated 318, for example, by being created on demand at DLT model factory 320 or by being retrieved from a repository 322. Thus, in one embodiment, a DLT model (304, 306, 308) is instantiated for each software component (312, 314, 316) in the SC model 310.

In one embodiment, each DLT model uses a data model shown in FIG. 7. A DLT instance for each software component in the SC may be created, for example, before the discovery process. The complexity of creating DLTs varies depending on whether the software component represents a simple application or a more complex middleware component. Generally, application DLTs tend to be simpler since applications typically do not transform or export data; such simple DLTs may be automatically created by software modeling tools. Modeling is well suited for such a task due to its ability to capture intended behavior at the time of software design and using it for online analysis. For instance Rational Rose or other model-driven software design tool may be used to produce a DLT from UML. Additional or alternatively, operator input may be used to build DLTs.

In one embodiment, DLT models do not include any installation-specific details of the data consumption and transformation of software components since, for example, such information is known only after installation time. Examples of installation-specific details are absolute pathnames or machine names. Instead, the DLT models 304, 306, 308, in one embodiment, use variables (bound at a later time) to represent such information. To capture installation-specific information about data consumption and transformation, the disclosed system and method specifies, for example, the Data Locations Instance (DLI) meta-model and model shown in FIG. 4, which are extensions of the DLT meta-model and model respectively.

Figure 4:
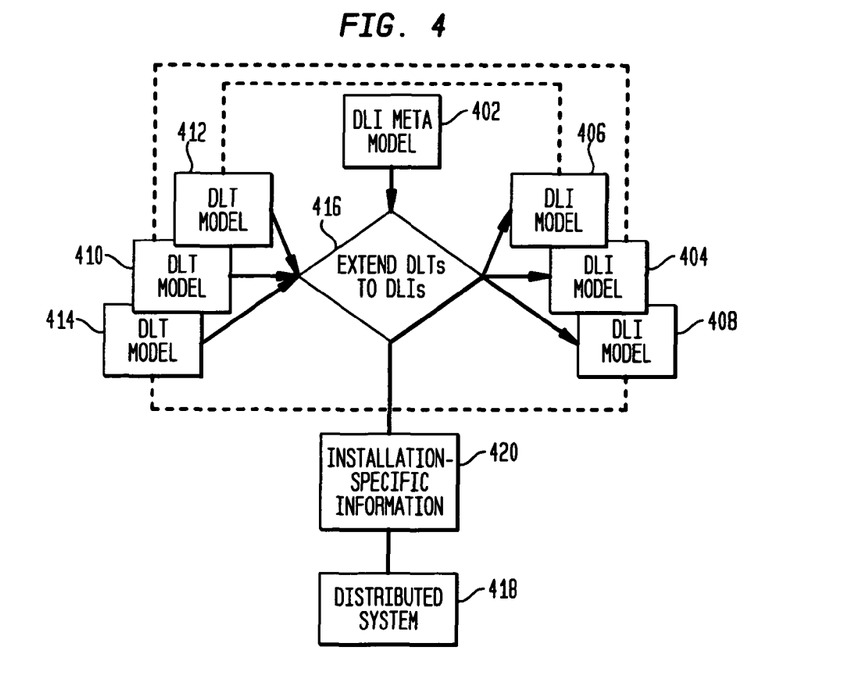
FIG. 4 is a block diagram illustrating extending from DLT models to DLI models in one embodiment.

FIG. 4 is a block diagram illustrating extending from DLT models to DLI models in one embodiment. DLT models 410, 412, 414 of software components are extended at 416 to corresponding DLI models 404, 406, 408, for instance, by mining installation-specific information 420 from the distributed system 418. The DLI models 404, 406, 408 follow, for instance, the schema of the DLI meta-model 402 shown in FIG. 8. FIG. 8 illustrates an example of a UML diagram describing the DLI meta-model. DLI model schema includes ref ("reference") attribute in the DLIComponent and DataSet elements 802, 804 of the DLI schema. The ref attribute points to entities of the distributed system infrastructure captured in the SC model. The value of each ref attribute is determined during the transformation from the DLT to the DLI model of a software component. The information that is added to the DLI models 404, 406, 408 may include, for example, absolute pathnames and machine names, references to deployed software or hardware elements using their names as listed in the SC model, for instance, described in the SC model of the distributed system, names of discovered data sets representing data use of software components, etc., and the like. In one embodiment, transformation rules are copied unmodified from the DLT to the DLI model of the software component.

In one embodiment, the process of extending DLT models to DLI models uses runtime support, for example, scripts and/or program of machine instructions to mine and extract information from the distributed system. Examples include invoking operating system (OS) registries, application server APIs, file system, other management APIs, other information sources, and the like. For instance, the DLI models and the SC model in one embodiment comprise the inputs to the distributed crawling and discovery process.

In one embodiment, the DLT and DLI meta-model structures may comprise two section, the Data Consumption section, and the Data Transformation section, as shown in the UML diagrams of FIG. 7 and FIG. 8. In one embodiment, the data transformation section may comprise one or more ExportedDataType elements (e.g., 702). Each ExportedDataType element may comprise a name, a description of the syntactic format of the namespace ("NameSpaceFormat") of the data type; and a description of the syntactic format of the namespace ("MappingFormat") of the data type that the exported data type maps to. In addition, each ExportedDataType may be associated with a MappingRule element (e.g., 704), which is a method for transforming (at runtime) a given name in the NameSpaceFormat to one or more corresponding names in the MappingFormat. In one embodiment, the MappingRule element method may be implemented by script(s), whose names are provided in the MappingRule element.

The data consumption section in one embodiment may comprise one or more DataSet elements (e.g., 706). Each DataSet may have a name attribute; that name may be specified according to (and thus associated with) the NameSpaceFormat of the ExportedDataType element of the software component exporting that data type. A DataSet element may additionally point to zero or more InformationSources (e.g., 708). InformationSources in one embodiment are dynamic sources of information (e.g., scripts whose execution returns information about the distributed system infrastructure) that may be required in order to fully determine the name of a DataSet.

Data consumption section, for example, describes data consumption of a software component, which in one embodiment may be typically described as a list of dataset names in some namespace and may be discovered in a number of ways. One example method for discovering data consumption is by looking at the application container providing runtime services (e.g., a J2EE application server or an operating system) to an application, to data providers (e.g., file systems, databases) whose services are used by applications, as well as application packaging and registry systems (e.g., J2EE .ear/.rar files, Linux RPMs, Windows registry, etc.). If not automatically discoverable, data consumption may be specified in DLTs by experts in the software components considered. Example cases of data use may include but is not limited to data in shared directories (e.g., /tmp), shared libraries (e.g., in windows\dll), and the like.

The system and method of the present disclosure uses the following example format to describe DATASETS:

Data Provider:Data Type$_i$;Data Name$_j$/(Data Type$_i$;Data Name$_i$)$^i$ where Data Type$_i$;Data Name$_i$ can be null, and i runs from zero up to a finite number. The above dataset name may contain wildcards (e.g., the equivalents of *, % in UNIX) and dynamically derived variables.

An example of a DLT model describing a J2EE application ("MyTrade3App"), which for example is part of the SC model shown in FIG. 6, is shown in XML format below:

```
<DLTComponent name="MyTrade3App" dataprovider="no"
dataconsumer="yes">
  <DataConsumer>
    <DataSet name="[%dataprovider]:[%pathnames]" >
      <InformationSource script="find-was-app-data" params=" " />
    </DataSet>
  </DataConsumer>
</DLTComponent>
```

This DLT describes that this J2EE application is consuming but not transforming data, for example, may be because data transformation is typically performed by middleware software. The DataSet tag in the above XML file leaves undefined the names of the data providers and pathnames of the data consumed by this component (variables %dataprovider and %pathnames) and instead points to an information source (a script, in this example) that can be used to bind these names to their installed values during the transformation of the DLT model to the DLI model.

Middleware systems, which often consume and transform/export data, involve somewhat more complex DLT instances, may be specified by human experts such as software developers or systems administration specialists. Additionally or alternatively, they may also be produced automatically, for example, by software modeling tools.

The data transformation section is described in one embodiment as follows. A middleware system that exports data abstractions (also referred to as a "Data Provider") describes the data transformation it implements in terms of a mapping between two namespaces, those of a higher and a lower level data abstraction. Typically, before describing such a mapping, the format of the namespaces of each data abstraction is defined. Similar to the format used to describe data sets, the system and method of the present disclosure uses the following regular expression to describe namespaces:

Data Provider:Data Type$_i$;Data Name$_j$/(Data Type$_i$;Data Name$_i$)$^i$ where Data Type$_j$, Data Name$_j$ can be null, and i runs from zero up to a finite number.

Examples of namespace formats are
db-instance-name:database;database-name/table;table-name (Relational database)

file-system-name:(file-or-directory;file-or-directory-name)$^i$ (File System)

eis-name:repository;repository-name/business-object; business-obj-name (EIS)

controller-name:logical-volume;logical-volume-name (Storage Controller)

controller-name:logical-volume;logical-volume-name/ block;block-number (Storage Controller)

Data transformation between a high-level data abstraction A and a low-level data abstraction B may thus be described by the following mapping:

$$\text{Data Provider}^A:\text{Data Type}^A_i;\text{Data Name}^A_i/(\text{Data Type}^A_i;\text{Data Name}^A_i)^k \rightarrow \text{Data Provider}^B:\text{Data Type}^B_i;\text{Data Name}^B_i/(\text{Data Type}^B_j;\text{Data Name}^B_j)^m$$

where i runs from 0 to k−1 and j runs from 0 to m−1. This naming convention reflects the hierarchical nature of the namespaces. In a hierarchical namespace, the name of a dataset comprises several components (or tree levels, if the namespace is seen as a tree). A typical example of a hierarchical namespace is that of files in modern file systems. The above representation generalizes file system namespaces by associating each level ("Data Type$_{Level\ number}$: Data Name$_{Level\ number}$") in the path with potentially a different data type (denoted by "Data Type$_{Level\ number}$"). The subscripts i and j enumerate the number of levels in the names of data abstractions A and B, respectively. The indexes k and m are their upper bounds.

In one embodiment, the above mapping is many-to-many and may contain wildcards and dynamically-derived variables. For example, any of the data name and type variables can be dynamically derived by executing scripts. The above transformation rules and associated dynamic scripts may be typically written by middleware developers or by those skilled in data transformation mechanics of the middleware software.

As an example, consider the following DLT excerpt (Data Consumption section of the DLT omitted) describing the data transformation performed by the DB2 middleware.

```
<DLTComponent name="db2" dataprovider="yes" dataconsumer="yes">
  ...
  <DataProvider>
    <ExportedDataType type = "table"
      NameSpaceFormat = "db2:\database;[%1]\table;[%2]"
      MappingFormat = "fs:\[%filename]"
      MappingRule = "db2fs-mapping" />
    <ExportedDataType type = "jdbcdrivers"
      NameSpaceFormat = "db2:\jdbcdrivers;[%1]"
      MappingFormat = "fs:\[%filename]"
      MappingRule = "jdbcdriver-mapping" />
  </DataProvider>
</DLTComponent>
```

This example describes two exported data types ("table" and "jdbcdrivers") that are implemented by a database software component. The first exported data type, whose name is "table" (and corresponds to a database table), is described as follows: The namespace format has two levels; the first level corresponds to the name of the database comprising the table; the second level corresponds to the name of the table itself. The exact names of the database and table to map are left as variables (%1 and %2) to be provided at the time of the invocation/execution of the MappingRule described below. The MappingFormat for the "table" data type corresponds to that of a typical file system. In other words, the "table" exported data type maps to one or more files. The MappingRule for the "table" data type points to a script, which encapsulates the runtime knowledge necessary to map any given (existing) database table to the files (in a back-end file system) that the table corresponds to. Similarly, in the "jdbcdrivers" exported data type (which corresponds to a JDBC driver typically needed by database users), the NameSpaceFormat has a single level and includes a single variable (%1), which will be bound to the specific name of a JDBC driver at a later time. The MappingFormat describes the namespace of a file system, just as in the case of the "table" exported data type. The MappingRule points to a script, which can discover at runtime the mapping of a JDBC driver to one or more files by looking up the file system underlying the DBMS.

As described above, in one embodiment, DLTs are extended to DLIs to include specific references to the system being considered. In transforming DLTs to DLIs, DLI instances may be automatically derived from DLT instances, for example, using appropriate runtime support that mines information from the distributed system considered. As an example, the DLI derived from the DLT of the "MyTrade3App" J2EE application described earlier can be produced automatically to generate the XML shown here:

```
<DLIComponent name="MyTrade3App" ref="cmns:MyTrade3"
  dataprovider="no" dataconsumer="yes">
  <DataConsumer>
    <DataSet ref="cmns:MyTradeCluster" name="wsas:\app;trade3" />
    <DataSet ref="cmns:DB2-node-wxa8"
      name="db2:\database;trade3db\table;holdingejb" />
    <DataSet ref="cmns:DB2-node-wxa8"
      name="db2:\database;trade3db\table;quoteejb" />
    <DataSet ref="cmns:DB2-node-wxa8"
      name="db2:\database;trade3db\table;keygenejb" />
    <DataSet ref="cmns:DB2-node-wxa8"
      name="db2:\database;trade3db\table;accountejb" />
    <DataSet ref="cmns:DB2-node-wxa8"
      name="db2:\database;trade3db\table;orderejb" />
    <DataSet ref="cmns:DB2-node-wxa8"
      name="db2:\database;trade3db\table;accountprofileejb" />
  </DataConsumer>
</DLIComponent>
```

In one embodiment, the transformation of DLTs to DLIs is fully automated and thus is performed without human intervention. Additionally or alternatively, operator input may be used to transform DLTs to DLIs. A process of transforming a DLT to a DLI may include, for example, invoking scripts to bind variables in dataset names, which in turn may involve calls to a number of APIs, such as the operation system ("OS") file system and registry, application service containers (e.g., J2EE AppServer), database configuration managers, and storage or other management systems or the like. Once created, the DLIs may be placed in well-known locations, for instance, at the installation directory of the software component they correspond to.

Figure 5:
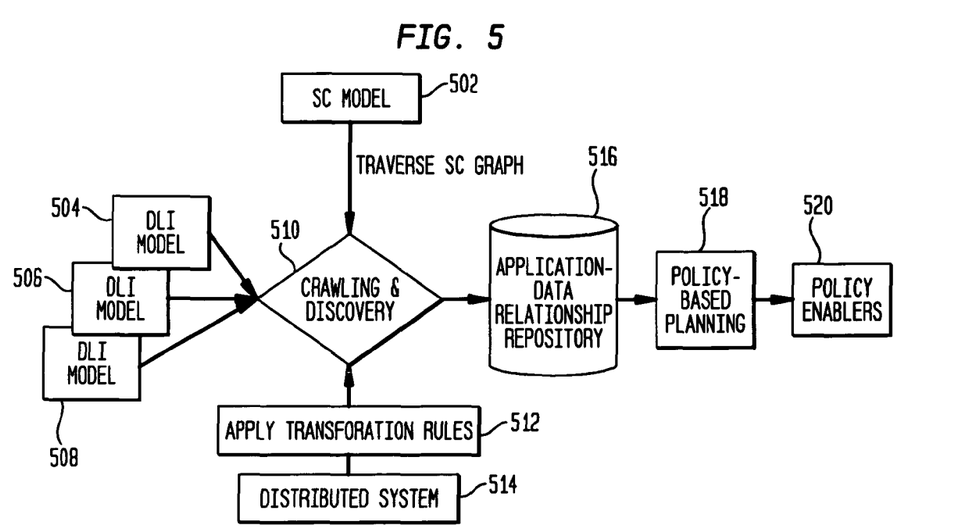
FIG. 5 is a block diagram illustrating crawling the SC model using the DLI models in one embodiment.

FIG. 5 is a block diagram illustrating crawling the SC model using the DLI models in one embodiment. In one embodiment, distributed crawling 510 of the SC model 502, discovers application-data relationships. The SC model 502 may be represented by a graph. When visiting a software component, one or more appropriate data transformation rules are taken from the DLI model 504, 506, 508 and applied as shown at 512. Traversal of the entire graph representing the SC model 502 and use of all applicable transformation rules provide end-to-end application-data relationships.

The output of the crawling and discovery process 510, which in one embodiment is the entire set of discovered application-data relationships, is stored in an application-data relationship registry 516. The output of the crawling and discovery algorithm stored in a repository 516 may include relationships between data across tiers and linkage of data to applications and identification of services implementing and providing the data. Uses of the discovered application-data relationships include policy-based planning tools 518, which for example formulate suitable systems management policies and feed them to policy enabling systems 520. For example, the application-data associations discovered can be used for performing application specific policy-based management. In one embodiment, the ability to reflect business decisions may be expressed at the application level to the level of data. As an example, Information Lifecycle Management (ILM) policies for disaster recovery can be formulated to describe the degree of disaster resiliency desired for data, in terms of the applications or business processes that own the data (e.g., "use a Recovery-Time Objective of 5 minutes for all data owned by Application X"), instead of the data themselves (e.g., "use a Recovery-Time Objective of 5 minutes for data items Y, Z"). Such policy formulation is simpler to compose and reduces the possibility of error in specifying all data items affected by the policy.

Figure 9:
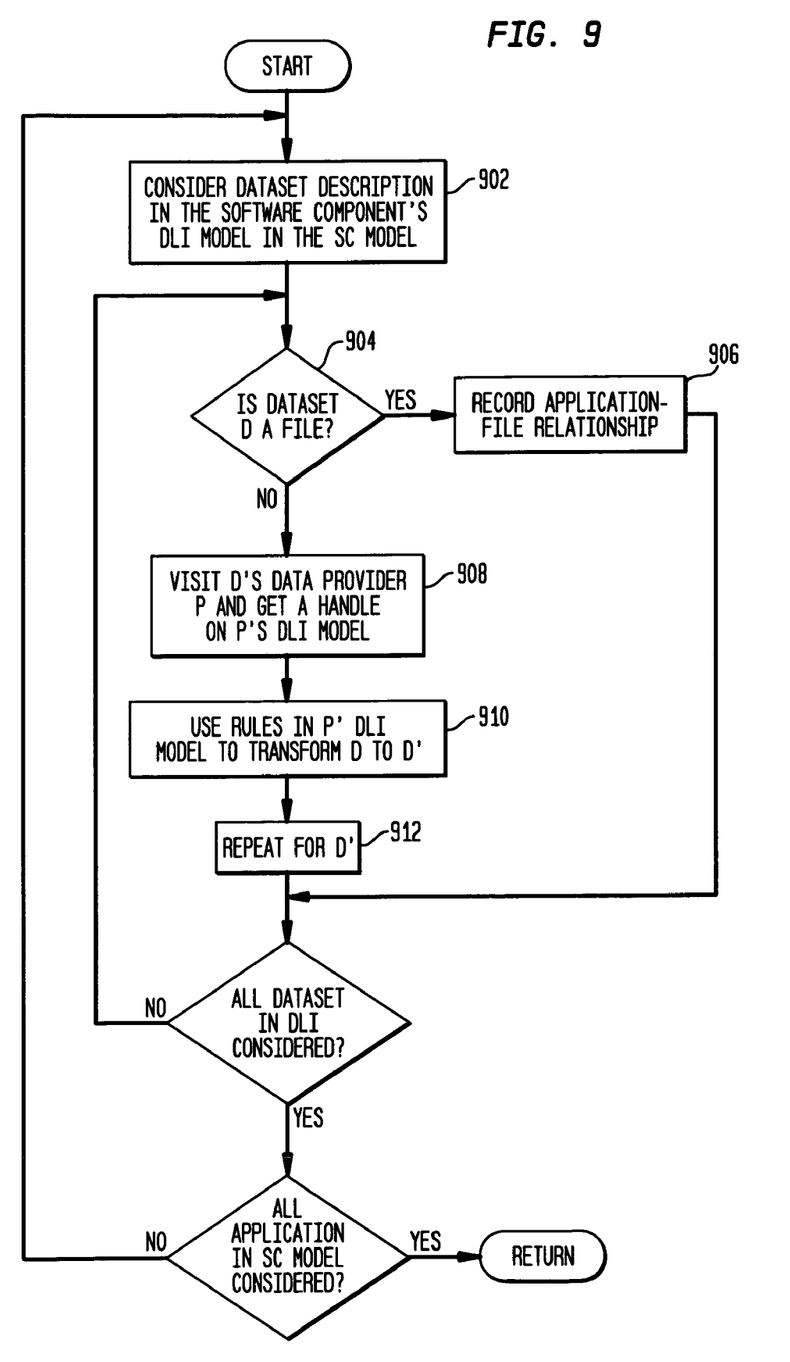
FIG. 9 is a flow diagram illustrating a method of discovering application-data relationship.

As described above, in one embodiment, the application-data relationship discovery may utilize a crawler algorithm. An example of a crawler algorithm used for the distributed discovery process is shown in FIG. 9. In one embodiment, inputs to the algorithm include but is not limited to system configuration (SC) model and DLIs for software components, for example, applications and middleware. At 902, for each application in the SC model, the method considers the dataset descriptions in the software component's DLI model. At 904, for each dataset D, if D is a file, the method records application-file relationship at 906. Otherwise the method visits D's data provider P and gets a handle on P's DLI model at 908. P, for example, is represented by a node in SC. The method in one embodiment may use remote procedure call (RPC) if the node is located on one or more remote machines. At 910, the rules in P's DLI model are used to transform D to D'. At 912, steps 904 to 910 are repeated for D'. In one embodiment, the output, discovered application-data relationship is stored in a database.

In one embodiment, actual remote procedure calls are not necessary if it is always possible to invoke the middleware APIs remotely. This is possible in managed environments with systems like WebSphere and DB2 but may be difficult with lower level APIs such as the OS API on single-machine nodes. However, the use of intermediate management APIs such as TPC (TSRM) or TSM may be used to provide similar information through publicly and remotely accessible APIs.

In one embodiment, the complexity of the above-described crawling and discovery process may be equal to the complexity of depth-first search (DFS). Its actual cost in practice depends on the cost, for example, delay, of invoking scripts that exercise the needed APIs. For example, if a DB2 instance manager is slow in responding, the overall cost will practically be proportional to the number of DB2 calls, for instance, the number of calls related to the number of database tables that need to be resolved.

Figure 10:
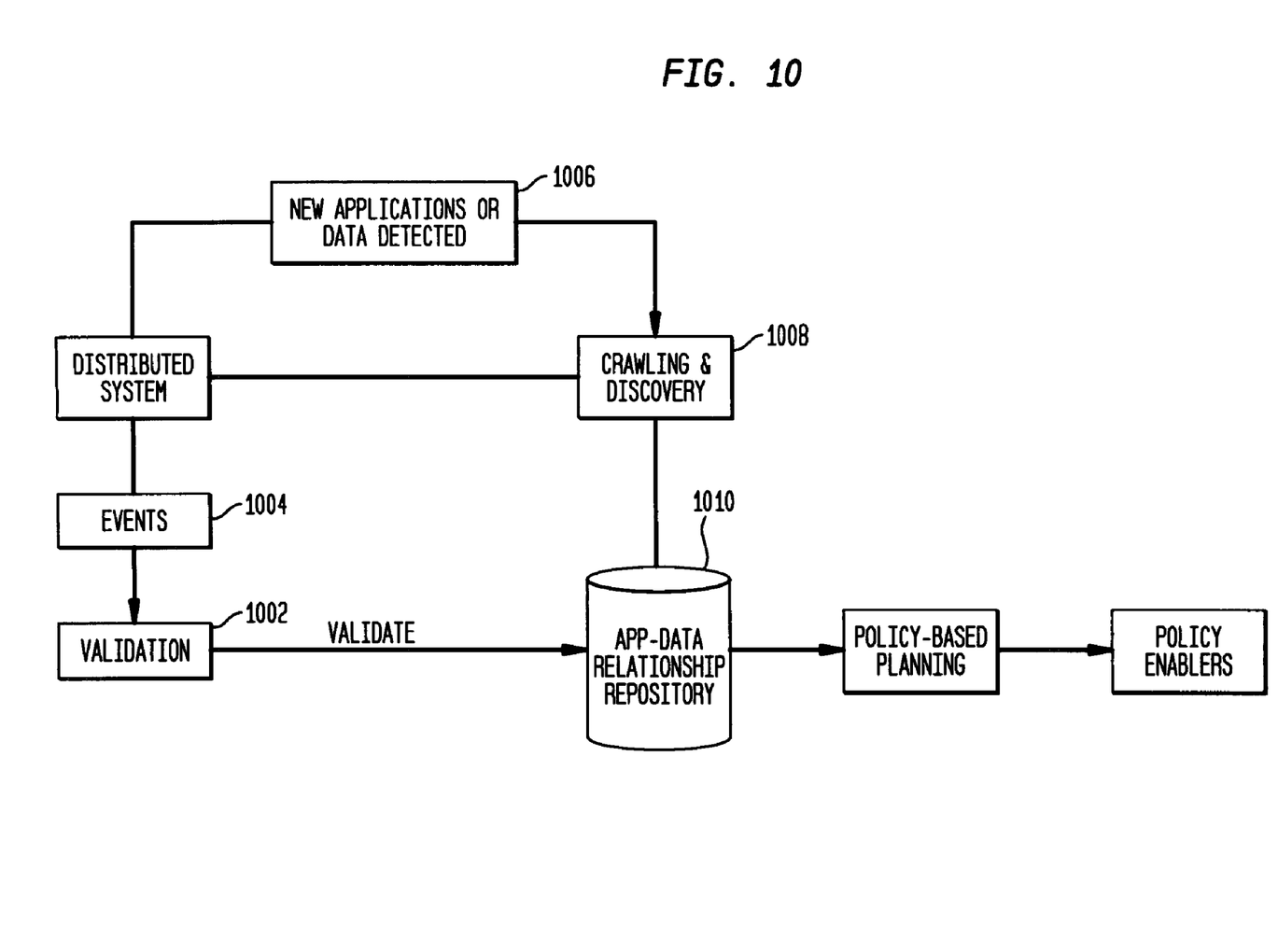
FIG. 10 is a block diagram illustrating validation and re-invocation of the discovery actions in one embodiment.

In one embodiment, the system and method of the present disclosure may also provide validating and rediscovering process. FIG. 10 is a block diagram illustrating validation and re-invocation of the discovery actions in one embodiment. In one embodiment, the validation process 1002 may be based on receiving and analyzing system events 1004, such as I/O and process activity, as shown in FIG. 10. For example, correlating a business component transaction or a database SQL query (detected via some JDBC log file or callback) with a file access operation can be an indication that a previously found relationship between the business component and that file is indeed valid. In addition, newly discovered relationships may be updated in the relationships database 1010. For instance, in the event that new applications or newly created data 1006 are detected, a new invocation of the crawling and discovery process 1008 can be triggered. This process can also be triggered either periodically or anytime new applications or data are detected.

In one embodiment, the system and method may be used to enable management policies that make use of the application-data relationship information. Examples of such policies are "Use a recovery time objective (RTO) of 5 minutes for all data owned or accessed by application APP", "Use a backup order priority directly proportional to the business value of data", and the like. In the examples, the application-data relationship information is used to group all data related to an application and to reflect on them the business value of the application.

In a case of data shared between multiple applications, different policies may be used. An example of sharing may be two applications accessing the same library files. For example, if two application APP1 and APP2 having different business values share a data item, that data item may be considered as having high or low value. For instance, a conservative policy may attribute high value to the data since at least one business rated as high value is using the data.

In one embodiment, the disclosed system and method is extensible. The framework that includes the meta-models and models described above is vendor-independent and general enough to describe any application or middleware system consuming or providing data. Examples of such middleware systems include but are not limited to J2EE application servers, database management systems, SAP, and Adaptive Business Objects (ABO). In an exemplary embodiment, the discovery is preferably from the applications to the lowest levels of the storage hierarchy. In one embodiment, unlike in the prior art systems, the system and method of the present disclosure in one embodiment identifies dependency specifically as it relates to applications' use of data.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for automatically discovering associations between applications and data, comprising:

modeling a system configuration of a computer system using a predefined template defining distributed system infrastructure, the modeled system configuration including at least description of one or more software components in the computer system;

modeling one or more software components described in the modeled system configuration using a predefined software component template, the modeled one or more software components including at least description of at least one of use and transformation of data by the one or more software components;

extending the modeled one or more software components to include at least installation-specific information related to the at least one of use and transformation of data by one or more software components, the extending performed using an instance meta-model associated with the predefined software component template, wherein the predefined software component template and the instance meta-model includes a data transformation section and a data consumption section;

traversing the modeled system configuration and the one or more software components to discover application and data associations, said traversing step including traversing a graph representing the modeled system configuration, invoking one or more remote procedure calls to retrieve information from a remote location, and invoking application program interface to retrieve information from a remote location;

the traversing to discover application and data associations including applying one or more rules of the data transformation section of the traversed software component, determining whether data in the data consumption section of the traversed software component is a file, and if the traversed software component is a file, recording the traversed software component and the file in an application-data relationship repository, and if the data in the data consumption section of the traversed software component is not a file, then determining another software component that is a provider of the data and traversing an extended model of said another software component to discover application-data relationship; and using the discovered application and data associations to plan management policy, wherein at least one of the steps of modeling are performed automatically using a software modeling tool, and at least one of the steps of modeling are performed using user input.

* * * * *